(12) United States Patent
Aleali

(10) Patent No.: US 6,786,091 B1
(45) Date of Patent: Sep. 7, 2004

(54) GUTTER OVERFLOW DETECTION DEVICE AND SYSTEM

(76) Inventor: Amin S. M. Aleali, 2530 E. Olivera Rd., Concord, CA (US) 94519

( * ) Notice: Subject to any disclaimer, the term of this patent is extended or adjusted under 35 U.S.C. 154(b) by 0 days.

(21) Appl. No.: 10/411,812

(22) Filed: Apr. 11, 2003

(51) Int. Cl.⁷ .............................................. G01F 23/30
(52) U.S. Cl. .............................. 73/309; 73/305; 73/322
(58) Field of Search .............................. 73/209 R, 305, 73/309, 322; 340/623

(56) References Cited

U.S. PATENT DOCUMENTS

| | | | | |
|---|---|---|---|---|
| 1,192,693 A | * | 7/1916 | Schultz | 73/322 |
| 1,193,744 A | * | 8/1916 | Wilkinson | 73/311 |
| 1,646,317 A | * | 10/1927 | Rein | 73/322 |
| 2,510,663 A | * | 9/1950 | Schuessler | 73/311 |
| 2,868,016 A | * | 1/1959 | Steed | 73/322 |
| 3,849,771 A | * | 11/1974 | Applin | 340/624 |
| 3,988,857 A | * | 11/1976 | Baumann | 47/59 R |
| 4,080,985 A | * | 3/1978 | Eagle | 137/429 |
| 4,771,272 A | * | 9/1988 | Barnes | 340/624 |
| 5,551,290 A | * | 9/1996 | Spiegel | 73/311 |
| 6,028,521 A | * | 2/2000 | Issachar | 340/624 |

* cited by examiner

Primary Examiner—Hezron Williams
Assistant Examiner—Rodney Frank
(74) Attorney, Agent, or Firm—Seed IP Law Group PLLC

(57) ABSTRACT

An overflow detection device is capable of determining whether liquid outside of the device has reached a predetermined level associated with an overflow condition. A container has a closed end and a capped end opposite the closed end. The container has an enclosing wall which extends from the closed end to an open or capped end to define an interior region. A hole or holes are formed in the enclosing wall. The holes are positioned a predetermined distance from the closed end of the container. The holes permit flow of the liquid into the interior region of the container when the liquid level reaches the predetermined level. A flotation piece is situated in the interior region of the container. The flotation piece is capable of floating on liquid which has flowed into the interior region. A visual indicator piece is coupled to or integral with the flotation piece. The visual indicator piece rises with the flotation piece when the level of the liquid contained in the interior region of the container rises.

31 Claims, 15 Drawing Sheets

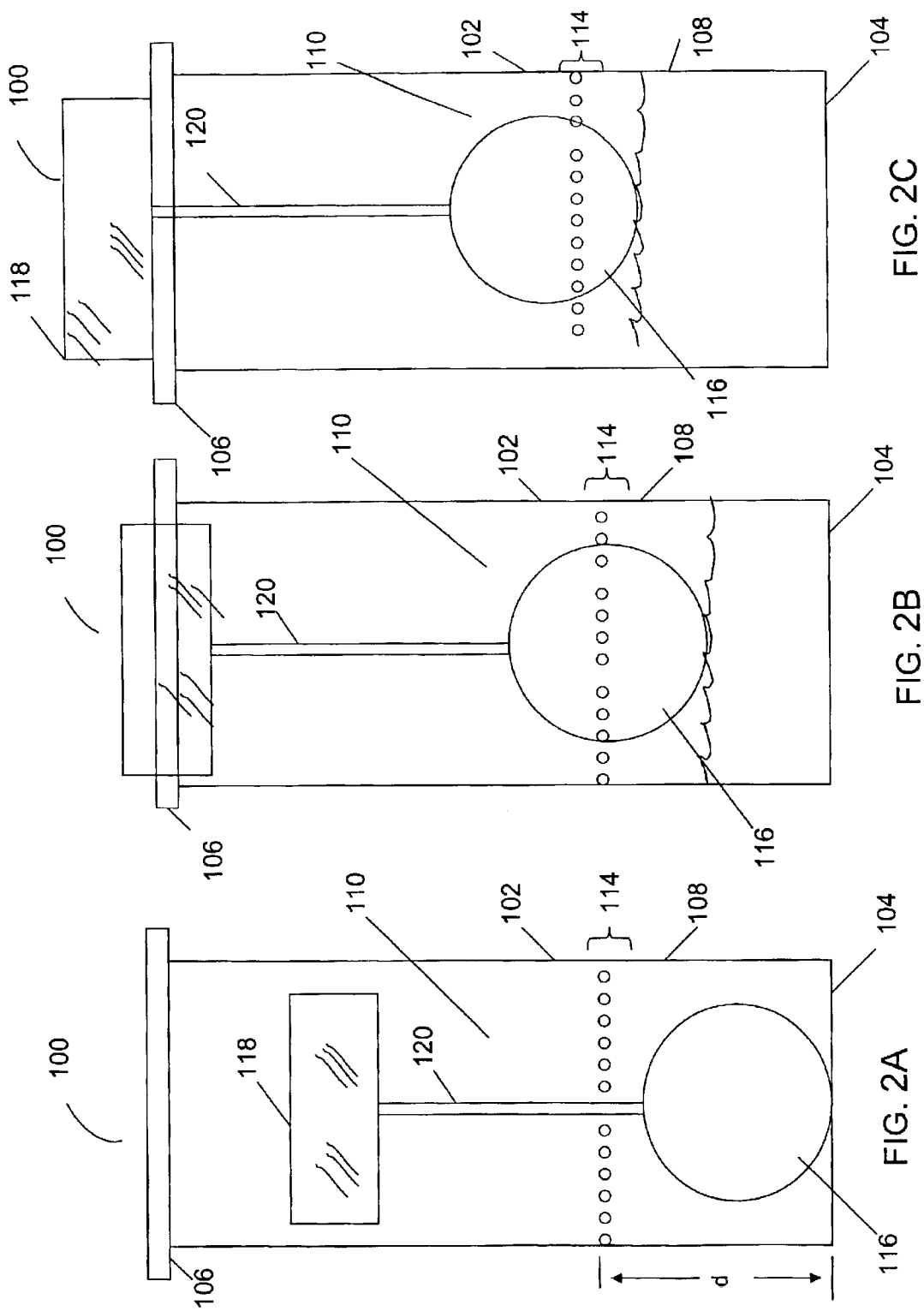

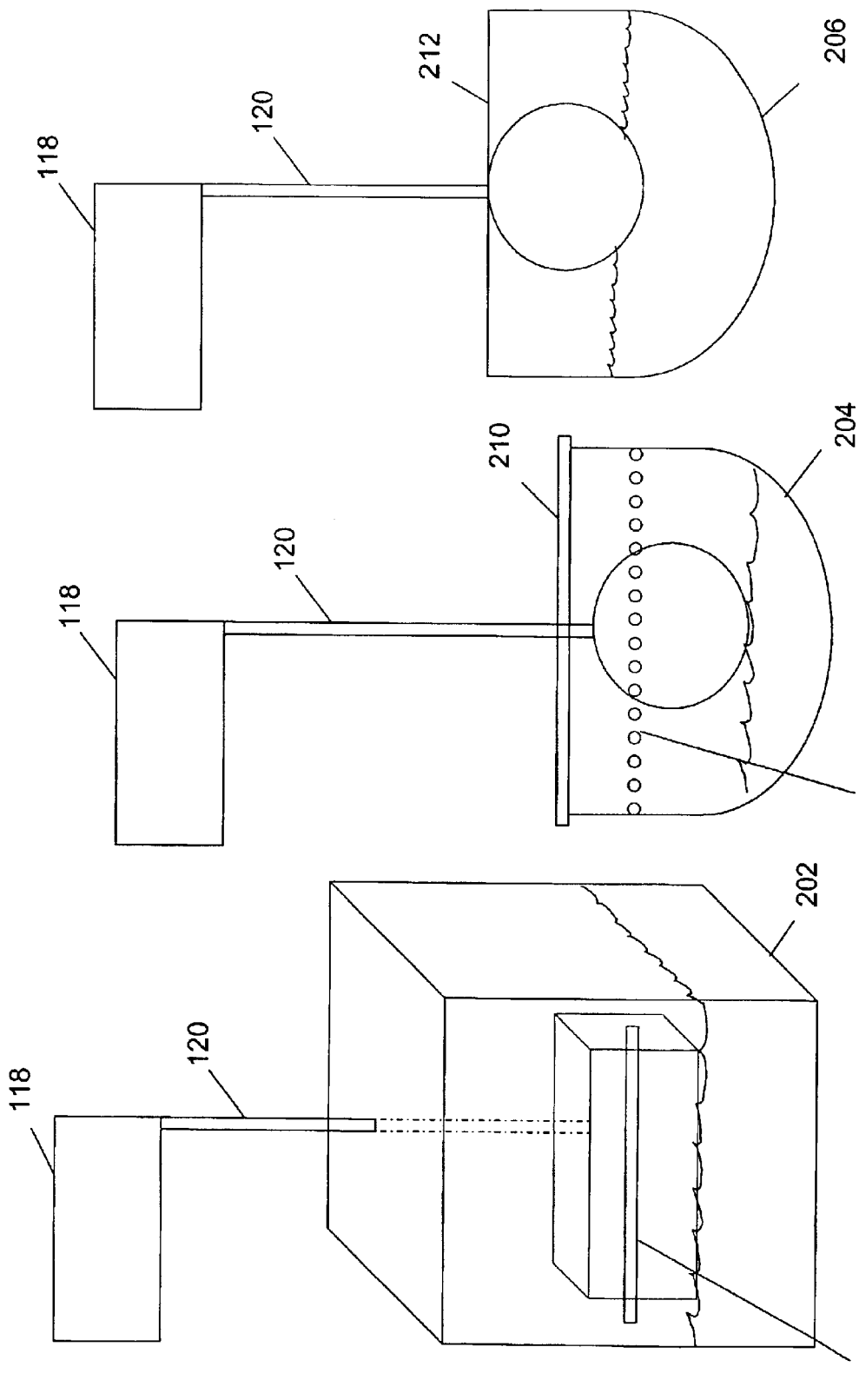

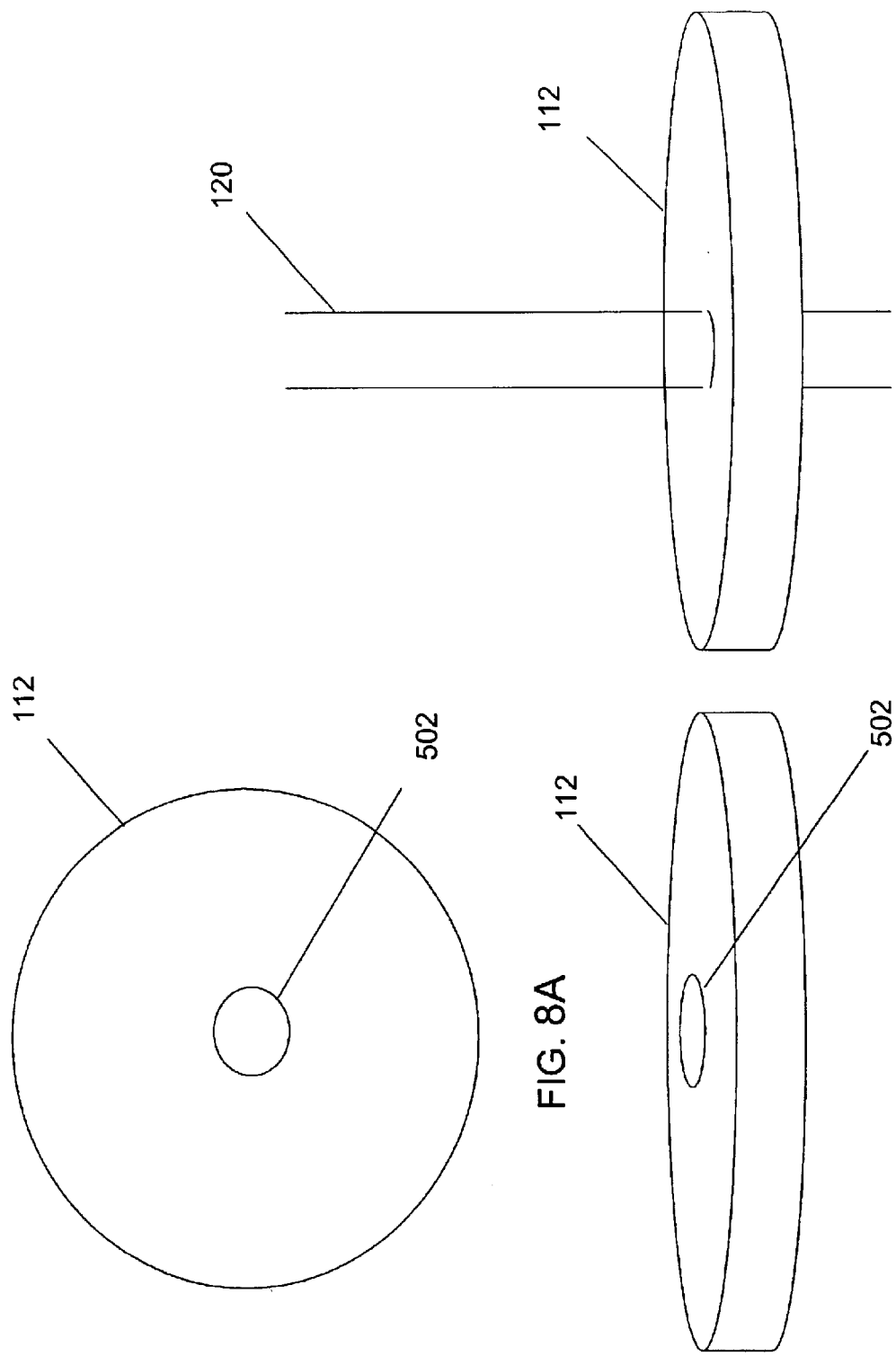

GUTTER OVERFLOW DETECTION DEVICE AND SYSTEM

FIELD

The present invention relates generally to the monitoring of a liquid level in a channel or container for detection of an overflow condition. More particularly, the present invention relates to monitoring the water in a gutter to determine whether the water has risen to a level indicating that the gutter is obstructed.

BACKGROUND

Liquid is often stored and moved in a wide variety of industrial and domestic applications. The fluid nature of liquids requires the monitoring of the liquid level in many applications. For example, when a liquid such as water flows through a channel or valley, it is often necessary to ensure that the channel does not become blocked, causing overflow of the liquid out of the channel.

One apparatus which involves the flow of liquids is the gutter. Gutters provide channels oriented to facilitate flow of liquids through the channels. Gutters are assembled in various configurations and used in a wide variety of applications. Some gutters are molded or built into a structure, while others are mounted or otherwise attached to a structure. Gutters are often attached along the perimeter of a roof of a building such as a house. In some instances, gutters are also mounted or built into central parts of the roof a house.

Gutters prevent damaging rainwater from running across windows, doors, down the siding and into a building such as a house. Gutters also channel water away from the foundation of the building, reducing the chance of soil erosion and damage to the foundation. Therefore, properly flowing gutters are important to the long-term well being of the building.

Gutters can be blocked by debris which has fallen into the gutter. In other situations, flow problems can be design related. For example, gutters may have been improperly sized with respect to the area and slope of the roof and the prevailing weather conditions. Also, there may be an insufficient number of downspouts, the gutters may have been improperly pitched when installed, or the gutters may need re-pitching due to settlement of the house or roofline having bowed or warped over time.

Regardless of the underlying cause of gutter flow problems, liquid is prevented from properly flowing through the gutter to an outlet or drain for proper disposition. As liquid continues to flow into the gutter, the liquid level rises. The liquid level will continue to rise until some breaking point is reached.

The breaking point for an obstructed gutter with rainwater is often the overflow of water from the sides of the gutter. A number of problems can then occur. Excessive water rots wood and increases mold and bacteria growth. This growth can result in health issues for those living in the dwelling. In addition, as water flows over the side walls of the gutter and lands on ground underneath the gutter, soil will erode. Such erosion can cause damage to the surrounding landscape and even the structural foundation of the building. The buildup of water in the gutter can also lead to direct damage of the gutter itself and the structure to which the gutter is molded or attached. This damage is often in the form of the gutter collapsing or breaking into pieces, and being forcibly detached from the structure.

When gutters are clogged, it is often difficult for an individual to determine the location of the obstruction. Viewing the gutter from below, such as the ground beneath and offset from the side of a building roof, an individual may see water overflowing from the gutter along the length of the gutter. However, the individual cannot easily ascertain the location along the gutter where the water flow is obstructed. Thus, the individual is required to climb a ladder, onto the roof, or otherwise elevate himself to a location above the gutter to look down into the gutter and ascertain the obstruction point.

Some mechanisms have been proposed to prevent the obstruction of gutters from reaching an overflow condition. One conventional mechanism is a wire mesh or other screen placed over the gutter to block debris and particles from entering the gutter. These devices simply operate as a prevention mechanism and do not provide for the detection of an obstruction. Furthermore, smaller particles will often slip through holes in the mesh or screen into the gutter and eventually cause an obstruction. Electronic devices have been proposed for monitoring gutter water levels. However, these devices require connection to a power supply and can encounter electrical troubles when exposed to liquids such as rain falling on the devices.

Thus, there remains a need for a gutter overflow detection device and system for detecting an overflow condition, alerting an individual that an obstruction has occurred, and providing guidance as to the location of the obstruction.

SUMMARY

According to one aspect of the present invention, an overflow detection device is capable of determining whether liquid outside of the device has reached a predetermined level associated with an overflow condition. The overflow detection device includes a container with an enclosing wall which extends from the closed end to the capped end to define an interior region. One or more holes are formed in the enclosing wall. The holes are positioned a predetermined distance from the closed end of the container. The holes permit flow of the liquid into the interior region of the container when the liquid level reaches the predetermined level. A flotation piece is situated in the interior region of the container. The flotation piece is capable of floating on liquid which has flowed into the interior region. A visual indicator piece is integral with the flotation piece, so the visual indicator piece rises with the flotation piece.

According to another aspect of the present invention, an overflow detection device includes a container which has a closed end and a capped end opposite the closed end. The container has an enclosing wall which extends from the closed end to the capped end to define an interior region. A plurality of holes are formed in the enclosing wall. The holes are positioned a predetermined distance from the closed end of the container. The holes permit flow of the liquid into the interior region of the container when the liquid level reaches the predetermined level.

A flotation piece, provided according to aspects of the present invention, is situated in the interior region of the container. The flotation piece is capable of floating on liquid which has flowed into the interior region. A visual indicator piece is coupled to the flotation piece by a shaft extending through a hole formed in the capped end of the container. The shaft and visual indicator piece rise with the flotation piece when the level of the liquid contained in the interior region of the container rises.

According to yet another aspect of the present invention, the overflow detection device is situated in a gutter for determining whether water in the gutter has reached an overflow condition. The container is mounted such that the container extends at least partially into a valley of the gutter. The closed end of the container is situated in the valley of the gutter. The container is positioned with respect to the valley of the gutter such that the holes permit flow of the gutter water into the interior region of the container from the gutter when the water level reaches a predetermined level. The flotation piece rises responsive to rising of a level of the water contained in the interior region. The visual indicator piece rises with the flotation piece.

According to yet another aspect of the present invention, the gutter overflow detection device is one part of an overflow monitoring gutter and drainage system. The overflow monitoring gutter and drainage system further includes one or more gutters attached along a roof of a building, and one or more drains attached along a wall of the building. Each drain has a first open end in fluid communication with an opening formed in a valley of the gutter, and a second open end opposite the first open end for disposing of the water. One or more of the containers described above are situated at locations in the gutters for determining whether water at the locations has reached an overflow condition.

BRIEF DESCRIPTION OF THE FIGURES

The detailed description below may be better understood with reference to the following figures. The figures illustratively show one or more embodiments of the invention, and are not intended to limit the scope of the claims in any way. The components in the figures are not necessarily to scale, emphasis instead being placed upon clearly illustrating principles of the present invention. In the figures, like reference numerals designate corresponding parts throughout the several views.

FIGS. 2A–2C show side views of an overflow detection device 100 constructed according to another embodiment of the present invention;

FIGS. 5A–5C show views of overflow detection devices constructed according to further embodiments of the present invention;

FIGS. 8A–8C show several views of a removable lid constructed according to one embodiment of the present invention;

DETAILED DESCRIPTION

Figure 1:
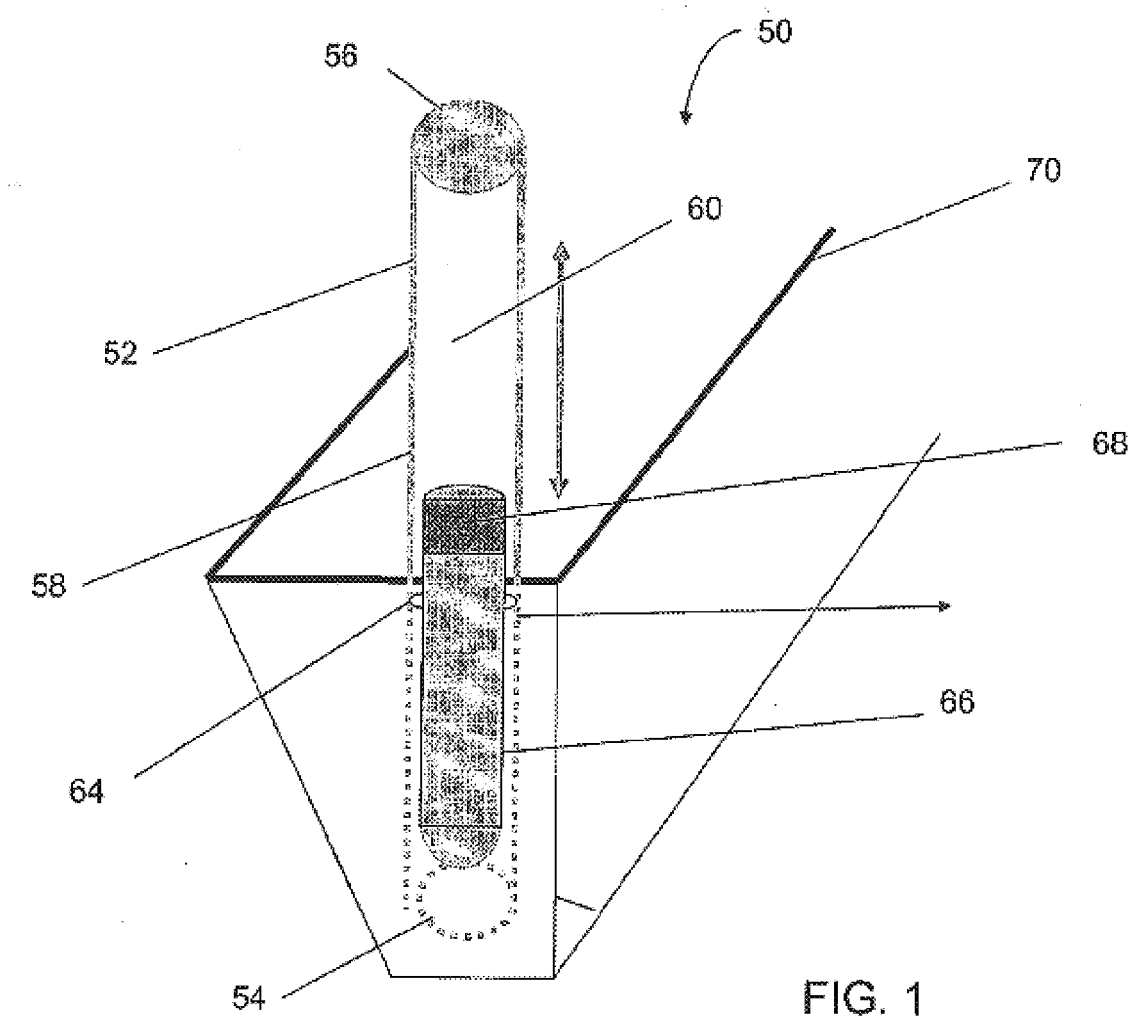
FIG. 1 shows a side view of an overflow detection device 50 constructed according to one embodiment of the present invention.

FIG. 1 shows a front view of an overflow detection device 50 for monitoring a liquid level to determine whether the liquid has reached an overflow condition. The device includes a container 52. The container has a closed end 54 and an open end 56 opposite the closed end 54. An enclosing wall 58 has a tubular shape and extends between the closed end 54 and the opened end 56. In this way, an interior region 60 of the container 52 is defined.

In FIG. 1, one or more holes 64 are formed in the wall 58. A flotation piece 66 is provided in the interior region 60 of the container 52. The flotation piece 66 has a visual indicator piece molded or attached at one end of the flotation piece. In this embodiment, the visual indicator piece 68 is preferably formed as an integral part of flotation piece 66. The visual indicator piece and flotation piece can be molded as one unit, attached by an adhesive material, or otherwise provided as an integral whole.

The flotation piece 66 is capable of floating on liquid when liquid enters the container 52 through the hole or holes 64. As liquid level in container 52 rises, the flotation piece 66 including visual indicator piece 68 rise with the water level. The container 52 is situated in a gutter 70 as shown in FIG. 1. The attachment and particular positioning of overflow detection device 50 with respect to gutter 70 is described below.

FIGS. 2A–2C show side views of an overflow detection device 100 for monitoring a water level to determine whether the water has reached an overflow condition. The device 100 includes a container 102. The container has a closed end 104 and a capped end 106 opposite the closed end 104. The capped end 106 of the container 102 includes a removable lid 112 described below with reference to FIGS. 8A–8C. The capped end 106 prevents evaporation of liquid from the container 102 after liquid has stopped flowing into container 102.

In FIGS. 2A–2C, an enclosing wall 108 extends from the closed end 104 to the capped end 106 to define an interior region 110. In the embodiment shown in FIGS. 2A–2C, the enclosing wall has a tubular or cylindrical shape, as does the container. In other embodiments, some of which described below, the container has a variety of shapes suitable for water level monitoring and overflow detection.

In FIGS. 2A–2C, a plurality of holes 114 or slots are formed in the enclosing wall 108 of the container 102. The holes 114 are positioned a predetermined distance "d" from the closed end 104 of container 102, as indicated in FIG. 2A. In one embodiment, the holes extend around the enclosing wall 108 to form a ring. In other embodiments, a single hole or slot is provided at distance "d" from closed end 104. Various shapes and sizes of holes 114 or slots can be used in accordance with embodiments of the present invention.

In FIGS. 2A–2C, a flotation piece 116 is situated in the interior region 110 of container 102. The flotation piece 116 is capable of floating on liquid such as water in the interior region of the container 102. When water pours into container 102, as shown in FIGS. 2B and 2C, generally through holes 114, the water level in container 102 rises causing flotation piece 116 to rise with the water level. The flotation piece 116 thus rises responsive to movement of the water level in interior region 110 of container 102.

In FIGS. 2A–2C, a visual indicator piece 118 is connected to flotation piece 116 by a shaft 120. The visual indicator piece 118 is described below with reference to FIGS. 7A–7C. The shaft 120 is attached to the visual indicator piece 118 at one end, and attached to flotation piece 116 at the other end. The shaft 120 extends through a hole formed in capped end 106 of container 102, explained below with reference to FIGS. 8A–8C. Thus, visual indicator piece 118 rises with flotation piece 116 responsive to the rising of the water level contained in the interior 110 of container 102. Because capped end 106 prevents the evaporation of liquid from container 102, the flotation piece 116 and visual indicator piece 118 will stay in the raised position of FIG. 2C following a rain when liquid has slowed or stopped flowing through the gutter. Thus, a user can be alerted to a gutter obstruction even after flow problems occurred.

Figures 3A, 3B:
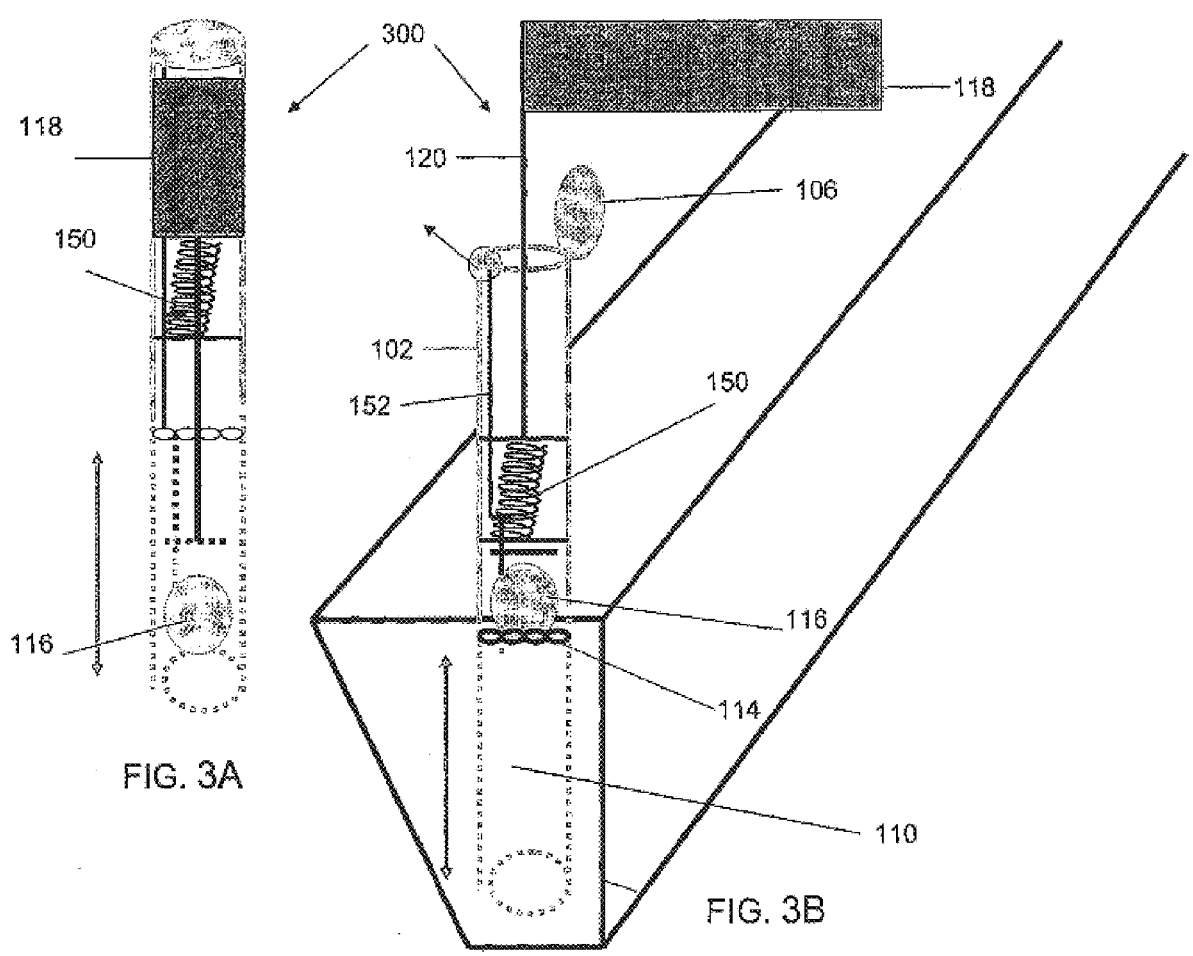
FIGS. 3A, 3B show side views of an overflow detection device 300 constructed according to another embodiment of the present invention.

FIGS. 3A and 3B show an overflow detection device 300 constructed according to another embodiment of the present invention. The overflow detection device 300 of FIGS. 3A and 3B is very similar to overflow detection device 100 of FIGS. 2A–2C, and like reference numerals indicate similar parts throughout. In addition to the elements described with reference to FIGS. 2A–2C, however, the overflow detection device 300 includes a spring 150 situated in the interior region of container 102 as shown. In addition, lid or cap 106 can open, as shown in FIG. 3B, while otherwise having a closed state as shown in FIG. 3A. A releasing arm 152 is provided in the interior region 110 as shown.

In FIGS. 3A and 3B, the shaft 120, instead of being attached directly to flotation piece 116, is positioned at one end of spring 150 which is situated between shaft 120 and flotation piece 116. Thus, the visual indicator piece 118 is spring-loaded. In this way, when the flotation piece 116 rises, the flotation piece 116 pushes on the releasing arm 152 which subsequently opens the lid 106 and the spring-loaded visual indicator piece 118 protrudes from the opened end of container 102 as shown.

Figure 4:
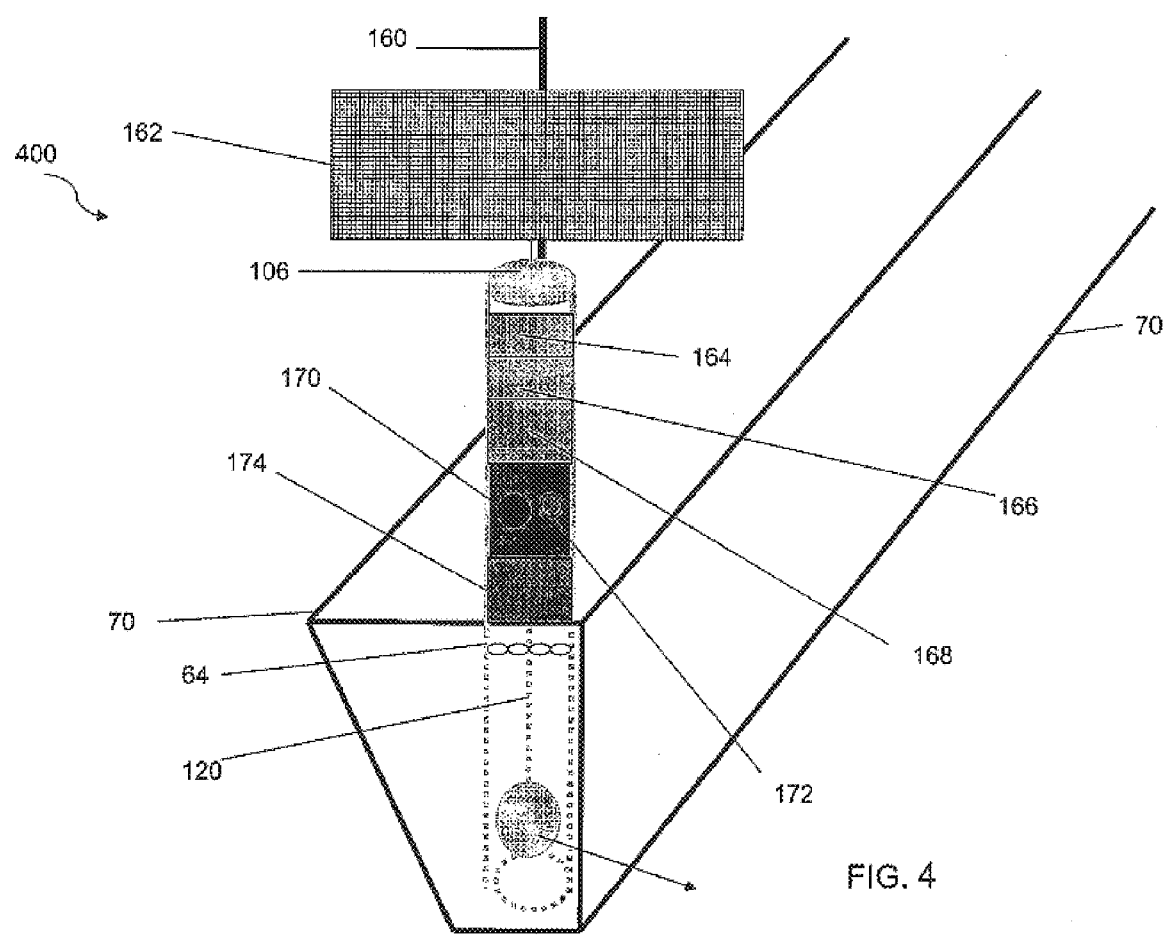
FIG. 4 shows a side view of an overflow detection device 400 constructed according to another embodiment of the present invention.

FIG. 4 shows an overflow detection device 400 constructed according to another exemplary embodiment of the present invention. The overflow detection device 400 includes an antenna 160 and a solar panel 162. In addition, unique to the device 400 of FIG. 4, is a charging sensor 164, a battery 166, and a transmitter 168. Further, the device 400 includes a warning buzzer 170, a warning LED 172, and a float sensor 174. The LED 172 and buzzer 170 both serve as alerting apparatus for a user that the gutter 70 needs attention. Responsive to monitoring information from float sensor 174, the LED 172 will flash, and/or the buzzer 170 can emit various audio signals such as short pulses so that a user will be made aware of a problem.

In FIG. 4, the device 400 monitors water level flow through the gutter 70 using similar techniques as described herein, and can transmit monitoring information gathered by float sensor 174 and/or pulse signals from LED 172 or buzzer 170 through antenna 160 to a central data processing location. The panel 162 is preferably a solar panel which stores power in battery 166. A charging sensor 164 monitors the powering or charging of battery 166. This charging information, in one embodiment, can also be transmitted to the central data processing location using antennae 160.

The transmission and processing of data indicating overflow conditions, using the device 400 of FIG. 4, is especially beneficial in any application involving the central monitoring of liquid levels and gutters on multiple houses. In one example, a condominium manager can monitor the status of gutters on many separate condos and buildings having condos therein at a central place such as the manager's office. In this way, the manager can get a handle on the status of gutters on the multiple houses and can take corrective action on any one of the condos or houses if an alarm is transmitted from one of the overflow detection devices. Thus, it is desirable that each overflow detection device 400 include, in addition to overflow detection data, identification information so that the central data processing unit can identify the particular device 400, gutter and house in which the device 400 is provided.

FIGS. 5A–5C show several overflow detection devices with various container shapes, constructed according to embodiments of the present invention. In FIG. 5A, a container 202 has a rectangular shape. Alternatively, in FIGS. 5B and 5C, containers 204 and 206 have bowl shapes. Container 202 has a long slot 214 formed in one or more sides, while container 204 has a ring of holes 208 formed about the bowl. A plurality of slots can also be formed in a wall of the container 202 to similarly allow for the passage of water into the interior of container 202. A liquid such as water enters containers 202 and 204 from the slot 214 and holes 208, respectively. Other shapes of holes, slots, or openings can be formed in the container wall(s) to allow for the passage of liquids into the container, as will be understood by those skilled in the art. A lid 210 defines a capped end of the container 204. In the alternative embodiment of FIG. 5C, container 206 contains no holes 204 and no lid 210. Water enters container 206 from an open end 212 of the container.

In FIGS. 5A–5C, the containers 202, 204, 206 can be made of a variety of materials such as plastic, rubber, wood, and metal. Preferably, these materials are weather-resistant. In one example, the container is made of a clear plastic so that an individual can observe the water level in the interior region of the container.

Figure 6C:
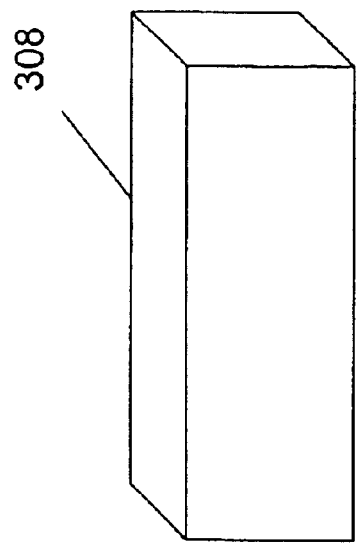
FIGS. 6A–6C show views of flotation pieces constructed according to embodiments of the present invention.
Figure 6B:
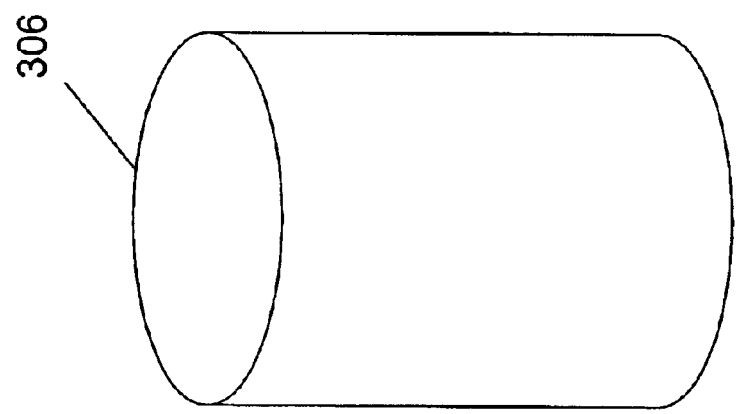
Figure 6A:
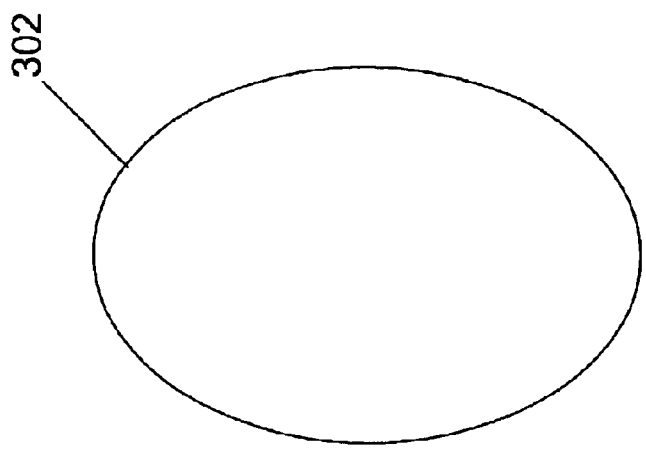

FIGS. 6A–6C show exemplary flotation pieces constructed and used in accordance with embodiments of the present invention. In FIG. 6A, a flotation piece 302 has an egg shape. In FIG. 6B, a flotation piece 306 has a cylindrical shape, suitable for use with a cylindrical or tubular container as shown in FIG. 1 or 2A–2C. Alternatively, a flotation piece 308 in FIG. 6C has a rectangular or cube shape. Flotation piece 308 is well suited for use in square or rectangular containers such as container 202 in FIG. 5A. Those skilled in the art will appreciate that flotation pieces used with embodiments of the present invention can have various shapes and sizes in addition to the general spherical shape shown in FIGS. 2A–2C and the other variety of shapes shown in FIGS. 6A–6C. The flotation pieces used in accordance with exemplary embodiments of the present invention are formed with various materials capable of floating or rising with a level of water or other liquid stored in the container. Materials such as plastic, rubber or a solid foam can serve this purpose.

Figure 7B:
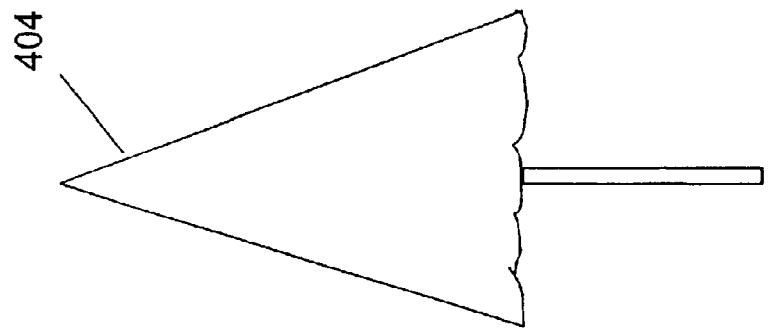
FIGS. 7A–7C show side views of visual indicator pieces constructed according to embodiments of the present invention.
Figure 7C:
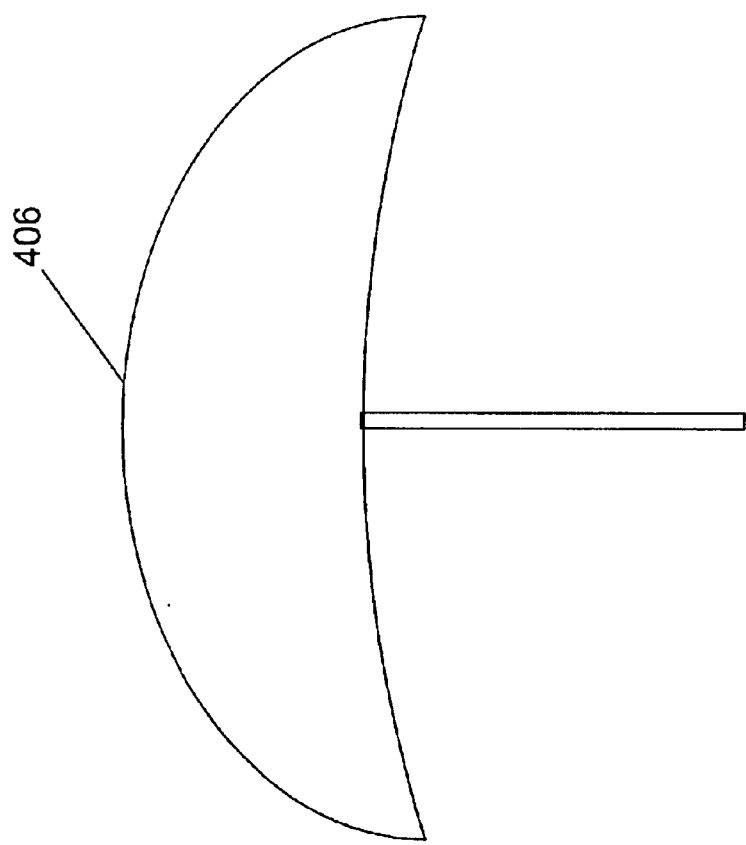
Figure 7A:
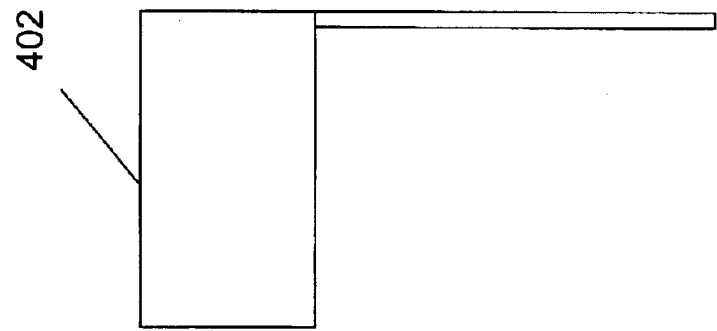

FIGS. 7A–7C show exemplary visual indicator pieces constructed according to embodiments of the present invention. As explained above, the visual indicator piece is generally coupled to one end of a shaft which is attached at the other end to the floatation piece. The visual indicator piece can include various materials such as cloth, rubber, and other flexible or rigid materials. The visual indicator piece can have a range of sizes and shapes suitable for providing a visual alert to an individual that the water level in the container has risen to a predetermined level associated with an overflow condition.

In one example, the visual indicator piece is shaped as a flag 402 as shown in FIG. 7A. As the floatation piece and shaft rise, so does flag 402, indicating that the overflow condition has occurred. The flag can have various shapes and sizes in addition to the rectangular shape shown in FIG. 7A. A cloth or plastic material can be used for flag 402. In some examples, the flag 402 has a color such as red or yellow to suggest to the individual that some problem has occurred. In other examples, the flag is coated with a fluorescent or reflective material such as aluminum.

Other shapes and sizes of the visual indicator include the cone-shaped indicator 404 of FIG. 7B, and the open umbrella or mushroom shaped indicator 406 of FIG. 7C. In one embodiment, the visual indicator 404 has the cone shape when the floatation piece is contained in the container in a lowered position, and expands to the mushroom or umbrella shape of FIG. 7C when the flotation piece rises above a predetermined level. Alternatively, a retaining tube or sheath can be attached to the capped end of the container to retain the visual indicator in the cone shape until the water level rises to the predetermined level, at which time the visual indicator pieces opens to the shape of FIG. 7C.

FIGS. 8A–8C show several views of lid 112 of overflow detection device 100. The lid 112 is removable from the container 102. In this way, a user can access the interior region 110 of container 102. For instance, the user can replace the flotation piece in the container or remove the flotation piece and shaft for cleaning. As shown in FIGS. 8A and 8B, a hole 502 is formed in the center of lid 112. The moveable shaft 120 extends through this hole 502, as shown in FIG. 8C. The lid 112 can be made of a variety of materials such as plastic or rubber. The lid 112 is formed to grip a rim of enclosing wall 108 to cap the container.

Figure 9:
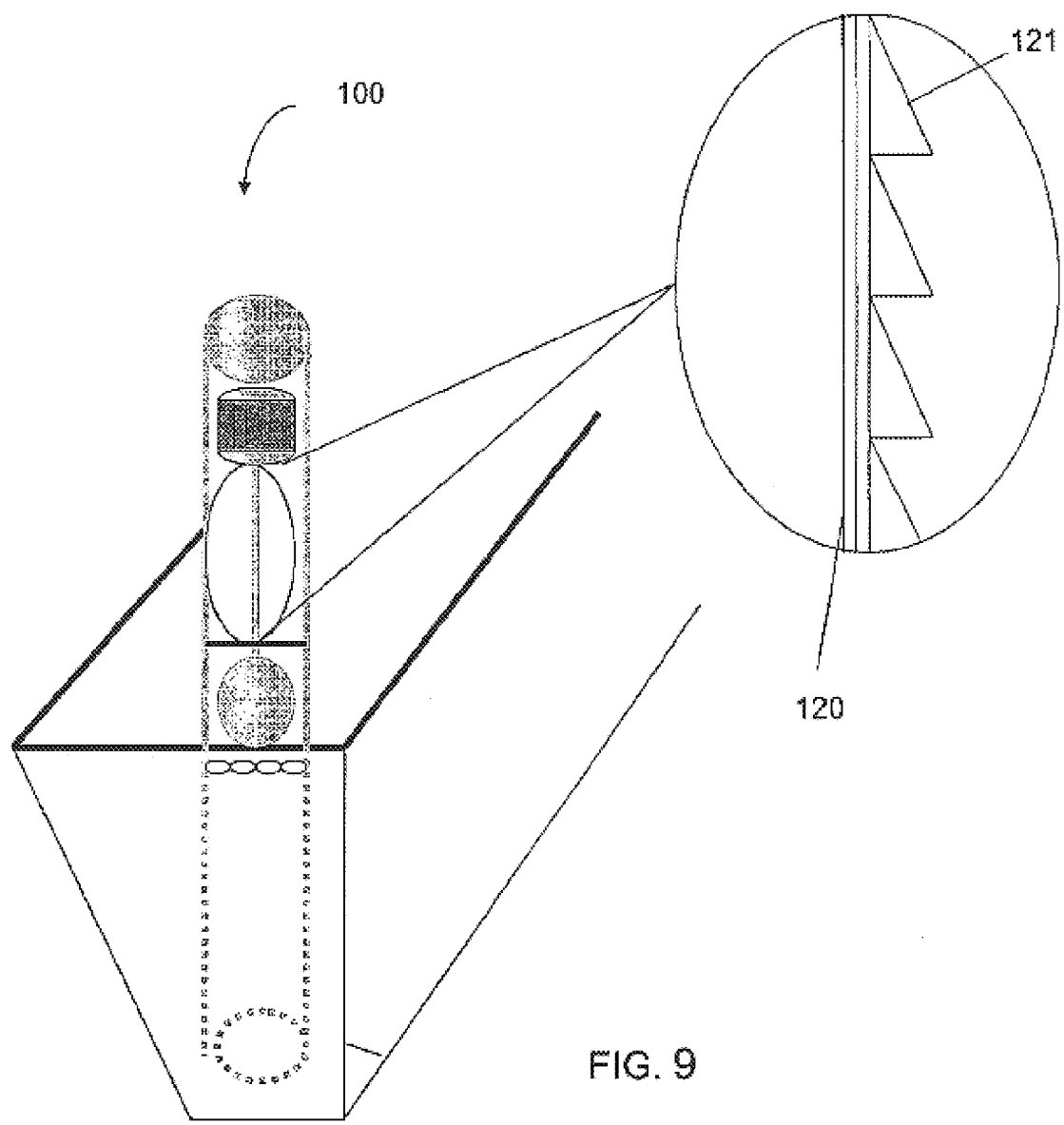
FIG. 9 shows a side view of an overflow detection device having a shaft constructed according to another embodiment of the present invention.

In FIG. 9, the overflow detection device 100 includes a saw tooth or serrated edge 121 formed on shaft 120. In this way, when the flotation piece 116 rises and the visual indicator piece 118 protrudes from the capped container 102, the saw tooth or serrated edges 121 to shaft 120 engage the hole 502 shown in FIGS. 8A–8C, so that the indicator piece maintains its raised position even if water underneath flotation piece 116 evaporates. Because of the interaction of the serrated edges 121 with hole 502, in this embodiment, the flotation piece 116 of visual indicator 118 is maintained in its raised position, as shown in FIGS. 2A and 3A, until a user resets the device. This is beneficial in alerting a user as to an obstruction even after flow problems have occurred. When rain stops, if the water level in device 100 falls due to leaks or evaporation, the visual indicator 118 stays in its raised position.

Figure 10B:
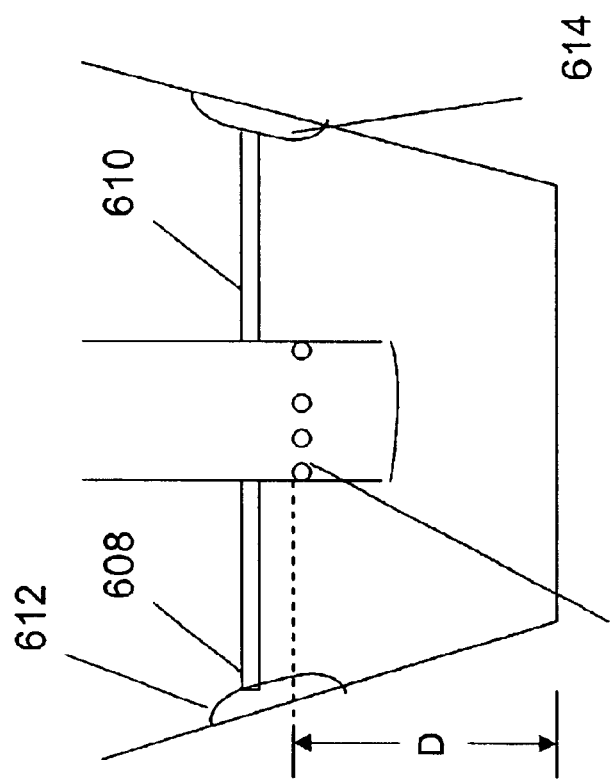
FIGS. 10A–10D show views of mounting mechanisms, for mounting overflow detection device 100 to a gutter, constructed according to embodiments of the present invention.
Figure 10A:
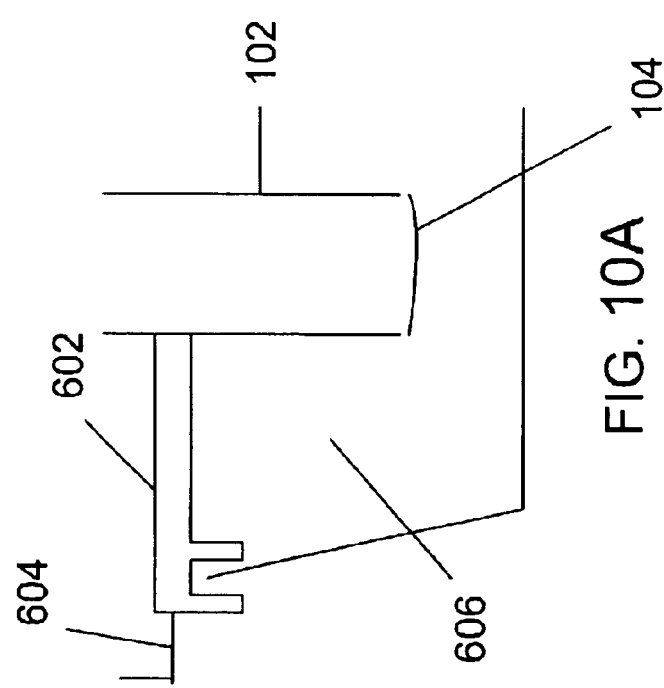

FIGS. 10A–10D show several embodiments of mounting mechanisms for attaching overflow detection devices to a gutter wall. Those skilled in the art will appreciate that an overflow detection device can also be mounted to some external structure, such as the roof of a building, for proper placement in a gutter. Further, those skilled in the art should understand that the overflow detection device can be situated in any other area in which water stands or is flowing. The gutter represents one of many uses for the overflow detection devices described above. In FIG. 10A, a clamp 602 engages one of the gutter walls as shown. A rotating arm 604 can be fitted to the clamp and turned to tighten the clamp similar to the manner in which a vice is tightened. The clamp 602 includes an arm attached to a side of the container 102. The arm of clamp 602 can be formed of a malleable metal or other solid so the container can be positioned as desired to extend at least partially into a valley 606 of the gutter. The closed end 104 of container 102 is situated in this valley 10 606 as shown in FIG. 10A.

FIG. 10B shows an alternative mounting mechanism constructed according to another embodiment of the present invention. In FIG. 10B, two retaining arms 608 and 610 are attached to sides of container 102. These retaining arms is extend in opposite directions to meet and engage walls of the gutter. A pad 612, preferably made of a flexible material such as rubber, can be attached to retaining arm 608 where arm 612 meets the gutter wall. A second pad 614 is similarly attached at an end of retaining arm 610, as shown in FIG. 10B. The pads ensure a secure connection between the retaining arms and the gutter wall. Preferably, the retaining arms are capable of being extended or retracted using conventional means. In one example, the retaining arms are threaded in a manner that the user can simply screw or unscrew the retaining arm to extend or shorten the length.

Figure 10D:
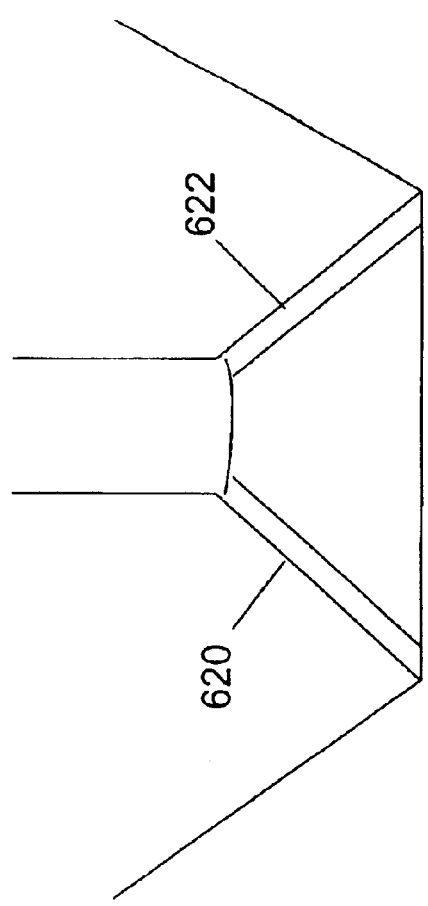
Figure 10C:
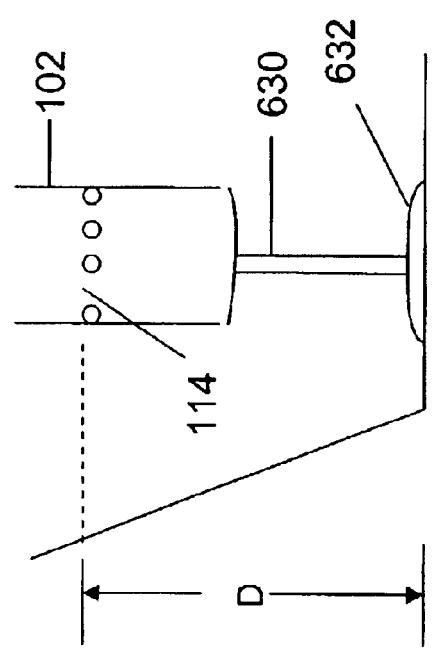

In FIG. 10C, an additional embodiment of a mounting mechanism is shown. In FIG. 10C, a single leg 630 is attached to the closed end 104 of container 102. The leg 630 is preferably centered under container 102 to provide an even weight distribution. Further, a mounting pad 632 is attached to the bottom of the leg. The mounting pad is preferably made of an adhesive material or magnetic material to provide a secure connection to the bottom of the gutter. In this way, when water flows through the gutter, the container 102 remains firmly attached to the gutter.

FIG. 10D shows a further embodiment of a mounting mechanism, constructed according to the present invention. In FIG. 10D, two legs 620 and 622 extend from the closed end 104 of container 102. The legs engage areas of the base of the gutter, as shown. The legs 620 and 622 are of a predetermined length so that the container is situated a predetermined distance from the bottom of the gutter.

In FIGS. 10A–10D, the various mounting mechanisms are used to ensure that holes 114 formed in the container wall are positioned at a predetermined distance "D" from the base of the gutter, as shown. This distance "D" can be set by adjusting the mounting mechanism to position the container at the desired height at which water is permitted to flow into the holes from the gutter. When the water level in the gutter reaches a height of D or exceeds that level, the water flows through the holes into the interior of the container.

Those skilled in the art will know that additional mounting mechanisms can be used in place of or in conjunction with the mechanisms shown in FIGS. 10A–10D. Also, various combinations of the mounting mechanisms shown in FIGS. 10A–10D can be used. For instance, the retaining arms 608 and 610 of FIG. 10B can be combined with the single leg 630 in FIG. 10C to secure container 102 at the sides and bottom of container 102.

Figure 11:
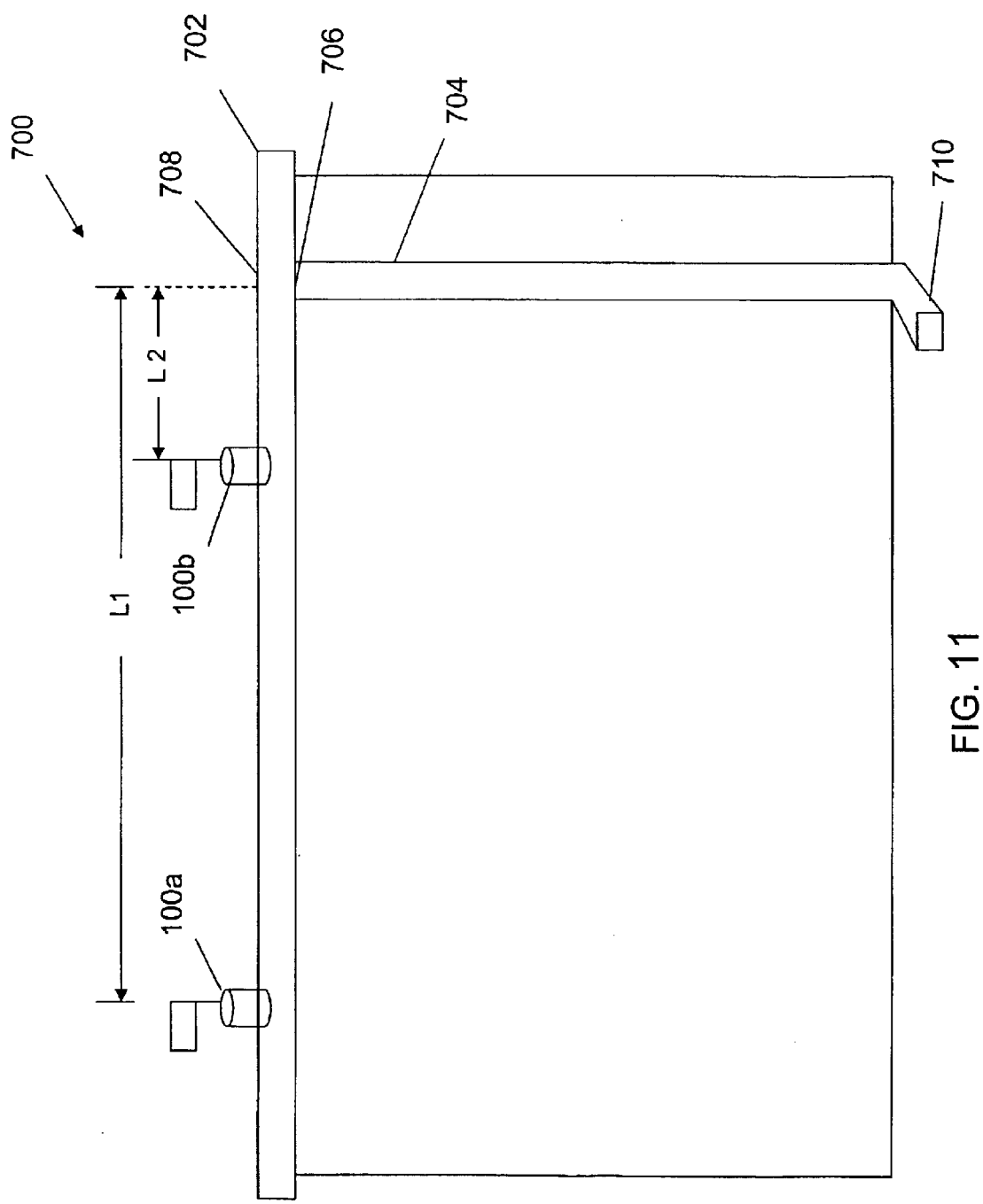
FIG. 11 shows a side view of overflow detection devices 100a, 100b situated in a gutter and positioned with respect to a drain, according to an embodiment of the present invention.

FIG. 11 shows overflow detection devices 100*a* and 100*b*, constructed according to any of the embodiments described above, as part of an overflow monitoring gutter and drainage system 700 for determining whether water in a gutter 702 has reached an overflow condition. The devices 100*a* and 100*b* can be mounted using any of the mounting mechanisms described above and positioned to define the overflow condition. In one instance, the holes in the container are positioned a predetermined distance from the base of the gutter slightly below the tops of the gutter walls. In this way, water flows into the container and the visual indicator piece is raised before the water flows over the gutter walls. In other instances, the container is lowered or even raised from this position to set the overflow condition.

In FIG. 11, the system 700 includes gutter 702 attached to a structure such as a building. In FIG. 11, a drain 704 is attached substantially vertically along a wall of the building. The drain has a first open end 706 in communication with an opening formed in the gutter at a drainage point 708 of the gutter. A second open end 710 of the drain is at the opposite end of the 704. Water enters the drain from gutter 702 at open end 706 of the drain, flows through the drain 704, and exists at second open end 710.

In FIG. 11, the gutter overflow detection devices 100a and 100b are positioned in gutter 702 at predetermined distances L1 and L2 from drainage point 708. For example, the gutter overflow detection devices 100a and 10b can be located at areas in which overflow conditions are likely to occur based on past experience. In FIG. 11, gutter overflow detection device 10a is remotely located from drainage point 708 by distance L1. Gutter overflow detection device 100b is separated from drainage point 708 by a distance of L2.

Figure 12:
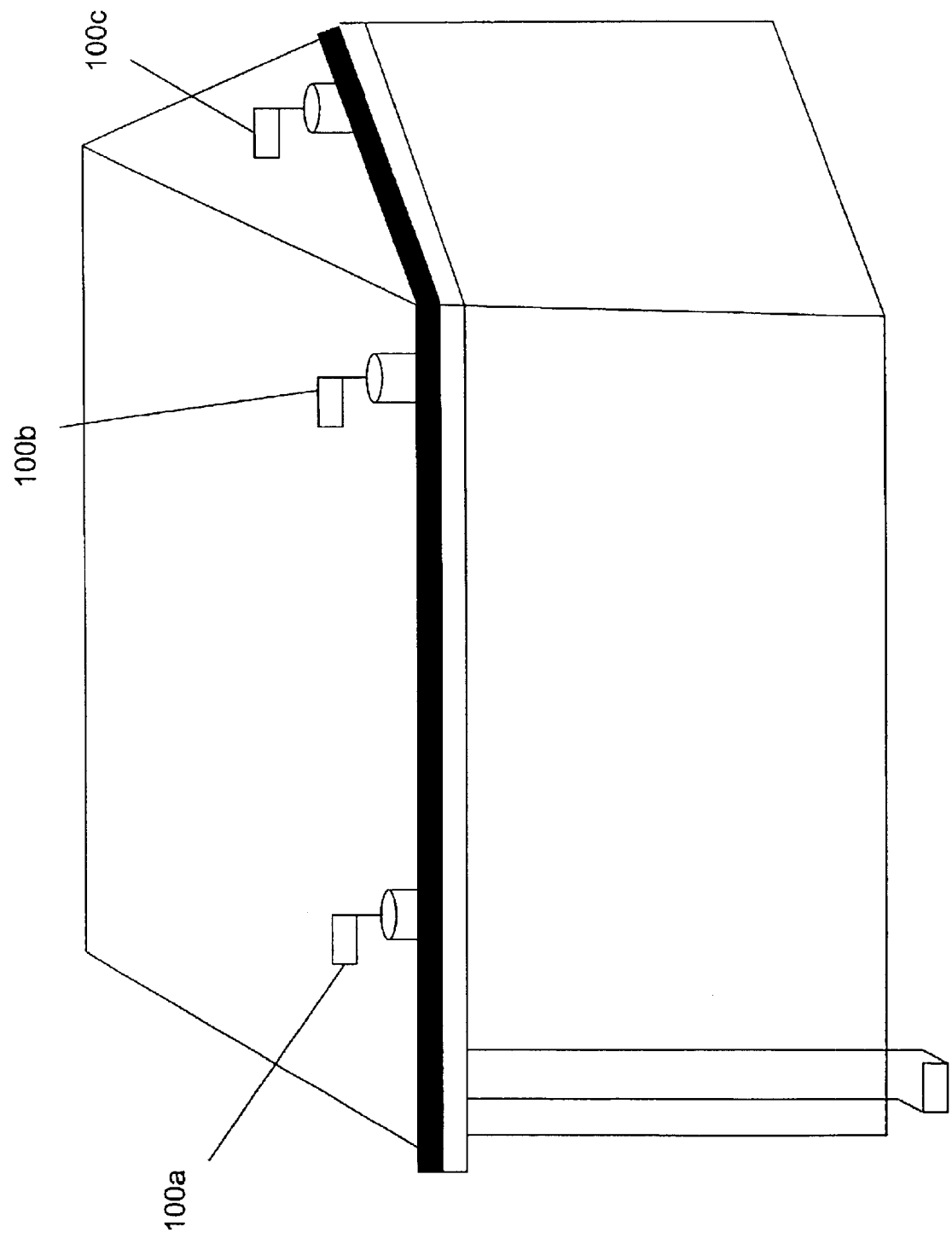
FIG. 12 shows a perspective view of overflow detection devices 100a, 100b, 100c as part of an overflow monitoring gutter and drainage system on a building, according to an embodiment of the present invention.

FIG. 12 shows a perspective view of an exemplary gutter overflow monitoring and drainage system, including overflow detection devices 100a, 100b, and 100c, used with a gutter assembly attached a house. The gutter assembly in FIG. 12 includes four gutter sections, each attached to a respective side of the house. Devices 100a, 100b, and 100c are situated in two of the gutter sections as shown. By observing overflow detection devices such as devices 100a, 100b, and 100c, a user can identify a section of the gutter assembly in which an obstruction has occurred.

Figure 13:
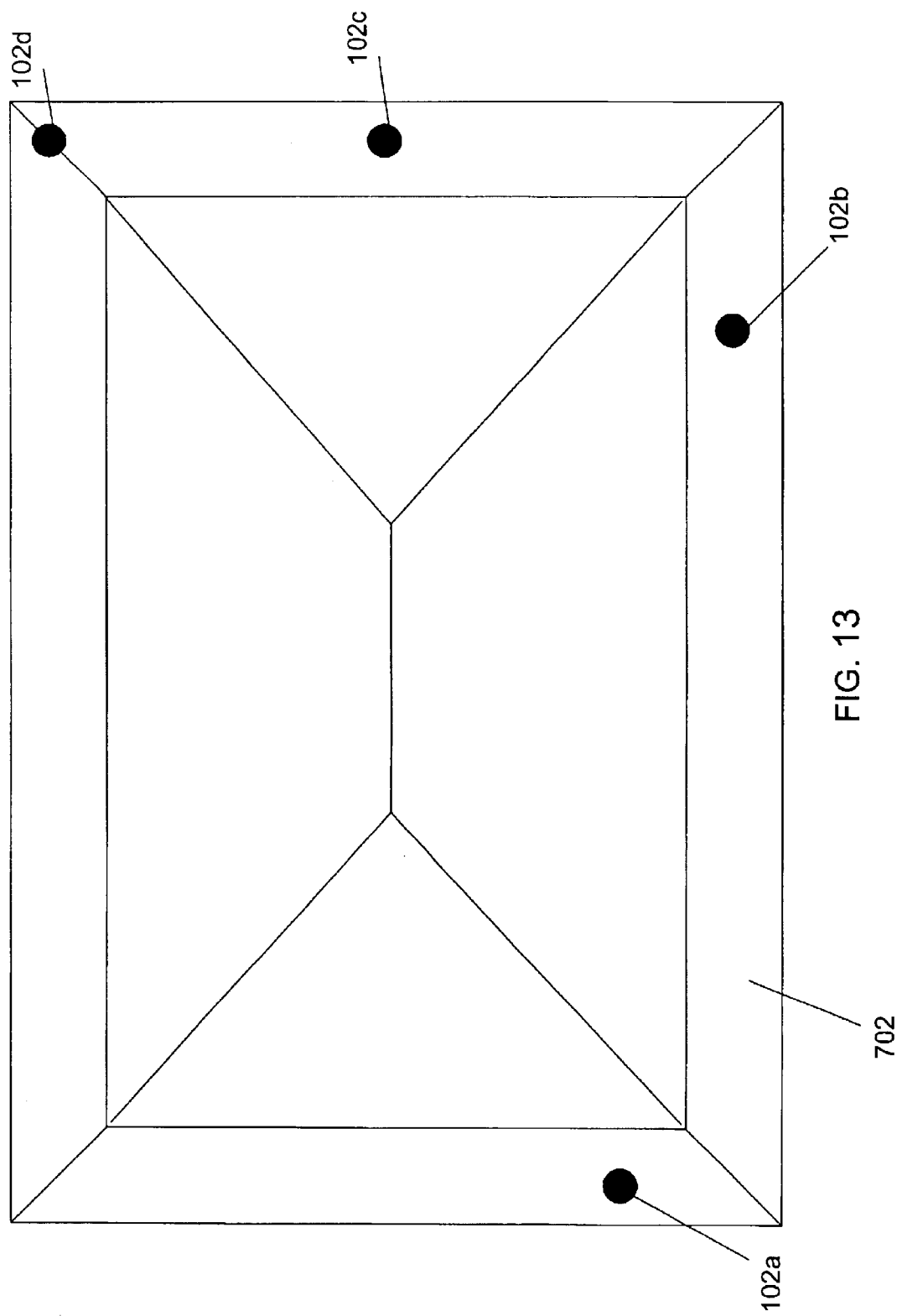
FIG. 13 shows a top view of a plurality of overflow detection devices as part of an overflow monitoring gutter and drainage system on a building, according to another embodiment of the present invention.

FIG. 13 shows a top view of a building, on which a plurality of gutter overflow detection devices 100a–100d are situated at predetermined locations of a gutter assembly about the sides of the roof. The gutter overflow detection devices are located at monitoring points of the gutter assembly. These monitoring points are remotely located from drainage points of the gutter assembly by predetermined distances, as explained above with reference to FIG. 11.

Figure 14:
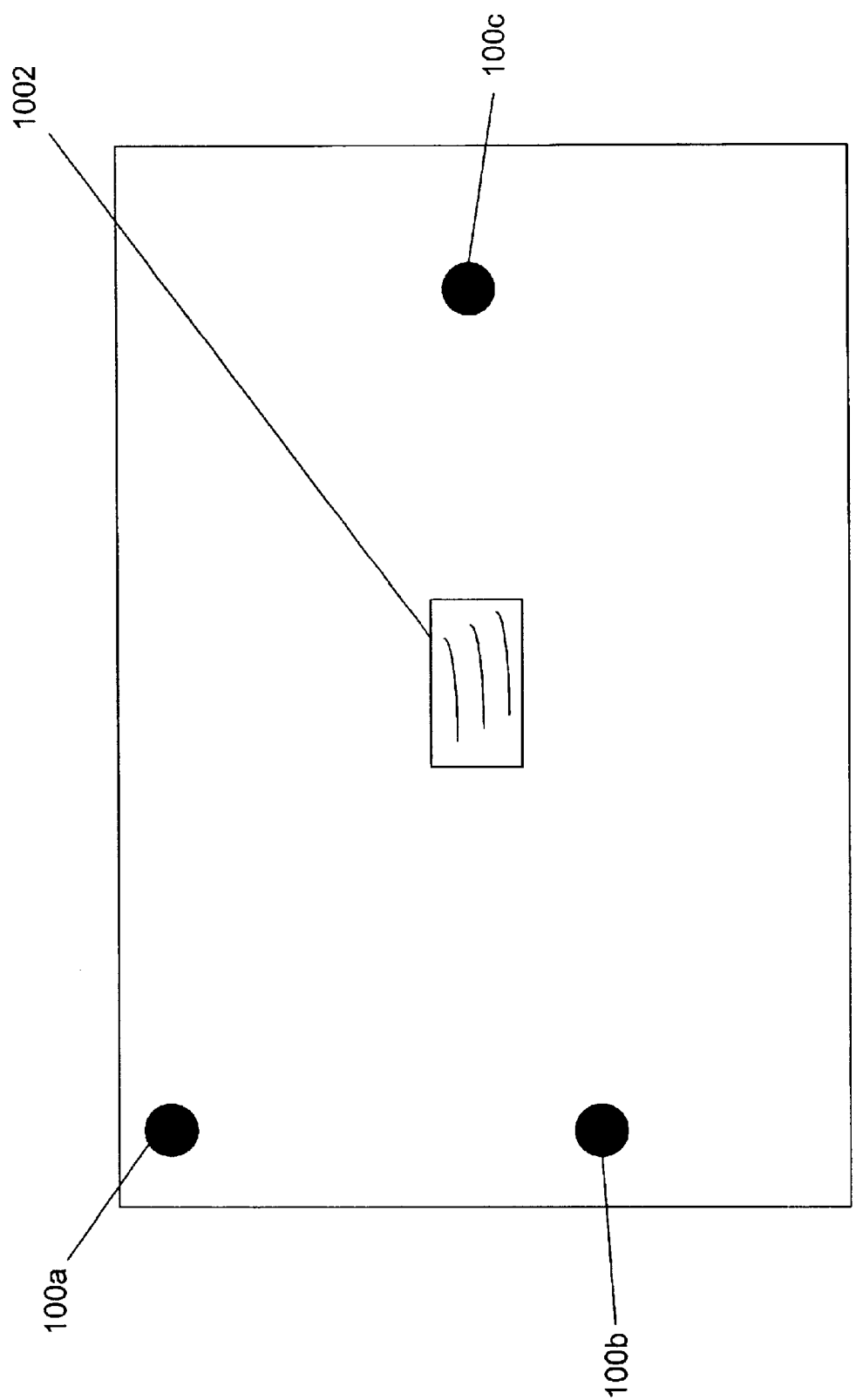
FIG. 14 shows a top view of a plurality of overflow detection devices on a flat roof of a building, according to yet another embodiment of the present invention.

FIG. 14 shows a top view of a flat roof of a building on which a plurality of overflow detection devices are situated, according to yet another embodiment of the present invention. In FIG. 14, the roof of the building has a drain 1002 centered at a drainage point of the roof. The overflow detection devices 102a–102c are located at monitoring points of the roof as illustrated and spaced apart from the drainage point by predetermined distances.

Gutter overflow detection devices constructed according to embodiments of the present invention, such as the overflow detection devices described above, can also be used as part of an enclosed gutter system. Such gutters are enclosed from the top, meaning that there is no conventional opening for water to flow into the gutter. The overflow detection devices described above can be placed in such enclosed gutters to alert a person positioned at ground level that water is not flowing properly within the gutters. The overflow detection device is particularly effective in this application since, even if the home owner were to climb onto the roof, he still would be unable to look and see whether the enclosed gutter was clogged.

It should be emphasized that the above-described embodiments of the invention provide examples for a clear understanding of the principles of the invention. Variations and modifications can be made to the above-described embodiments without departing from the spirit and principles of the invention, as will be understood to those skilled in the art. All such modifications and variations are intended to be included within the scope of the invention and protected by the following claims.

What is claimed is:

1. A gutter overflow detection device for determining whether water in a gutter has reached an overflow condition responsive to a level of the water, the gutter overflow detection device comprising:

a container mounted such that the container extends at least partially into the gutter, the container having a closed end situated in the gutter and an open end opposite the closed end, the container having an enclosing wall extending from the closed end to the open end to define an interior region, a hole being formed in the enclosing wall, the hole being positioned a predetermined distance from the closed end of the container, the container being positioned with respect to a valley of the gutter such that the hole permits flow of the gutter water into the interior region of the container from the gutter when the water level reaches a predetermined level;

a flotation piece situated in the interior region of the container, the flotation piece capable of floating on water contained in the interior region such that the flotation piece rises responsive to rising of a level of the water contained in the interior region, the flotation piece including a visual indicator piece formed at one end of the flotation piece proximate the open end of the container such that the visual indicator piece rises with the flotation piece responsive to rising of the level of the water contained in the interior region of the container, the visual indicator piece configured to provide notification of the overflow condition when the water in the gutter has reached the overflow condition.

2. The gutter overflow detection device of claim 1, the visual indicator piece including a reflective material.

3. The gutter overflow detection device of claim 1, the container having a cylindrical shape.

4. The gutter overflow detection device of claim 1, the container having a bowl shape.

5. The gutter overflow detection device of claim 1, the container being made of plastic.

6. The gutter overflow detection device of claim 1, the enclosing wail having a tubular shape.

7. A gutter overflow detection device for determining whether water in a gutter has reached an overflow condition responsive to a level of the water, the gutter overflow detection device comprising:

a container mounted such that the container extends at least partially into the gutter, the container having a closed end situated in the gutter and a capped end opposite the closed end, the container having an enclosing wall extending from the closed end to the capped end to define an interior region, a plurality of holes being formed in the enclosing wall, the holes being positioned a predetermined distance from the closed end of the container, the container being positioned with respect to a valley of the gutter such that the holes permit flow of the gutter water into the interior region of the container from the gutter when the water level reaches a predetermined level;

a flotation piece situated in the interior region of the container, the flotation piece capable of floating on water contained in the interior region such that the flotation piece rises responsive to rising of a level of the water contained in the interior region; and a visual indicator piece coupled to the flotation piece such that the visual indicator piece rises with the flotation piece responsive to rising of the level of the water contained in the interior region of the container, the visual indicator piece configured to provide notification of the overflow condition when the water in the cutter has reached the overflow condition.

8. The gutter overflow detection device of claim 7, wherein the visual indicator piece is coupled to the flotation piece by a shaft extending through a hole formed in the capped end of the container, the shaft having a first end attached to the visual indicator piece and a second end opposite the first end, the second end of the shaft attached to the flotation piece.

9. The gutter overflow detection device of claim 8, the shaft having serrated edges.

10. The gutter overflow detection device of claim 7, the holes extending around the enclosing wall to form a ring.

11. The gutter overflow detection device of claim 7, the capped end of the container including a removable lid.

12. The gutter overflow detection device of claim 7, the visual indicator piece including a flag.

13. The gutter overflow detection device of claim 7, the flotation piece having a spherical shape.

14. The gutter overflow detection device of claim 7, the flotation piece having an oval shape.

15. The gutter overflow detection device of claim 7, the flotation piece having a cylindrical shape.

16. The gutter overflow detection device of claim 7, the flotation piece having a rectangular shape.

17. The gutter overflow detection device of claim 7, the flotation piece including a plastic material.

18. The gutter overflow detection device of claim 7, the flotation piece including a foam material.

19. The gutter overflow detection device of claim 7, the container mounted to the gutter by a clamp.

20. The gutter overflow detection device of claim 7, the container mounted to the gutter by a retaining arm.

21. A gutter overflow detection device for determining whether water in a gutter has reached an overflow condition responsive to a level of the water, the gutter overflow detection device comprising:

a container mounted such that the container extends at least partially into the gutter, the container having a closed end situated in the gutter and a capped end opposite the closed end, the container having an enclosing wall extending from the closed end to the capped end to define an interior region, a plurality of holes being formed in the enclosing wall, the holes being positioned a predetermined distance from the closed end of the container, the container being positioned with respect to the valley of the gutter such that the holes permit flow of the gutter water into the interior region of the container from the gutter when the water level reaches a predetermined level;

a flotation piece situated in the interior region of the container, the flotation piece capable of floating on water contained in the interior region such that the flotation piece rises responsive to rising of a level of the water contained in the interior region; and a visual indicator piece coupled to a spring loaded shaft disposed in the container, the visual indicator piece rising responsive to the flotation piece rising, the visual indicator piece configured to provide notification of the overflow condition when the water in the gutter has reached the overflow condition.

22. An overflow monitoring gutter and drainage system for determining whether water has reached an overflow condition, the overflow monitoring gutter and drainage system comprising:

a gutter attached along a roof of a building;

a drain attached along a wall of the building, the drain having a first open end in fluid communication with an opening formed in a valley of the gutter at a drainage point of the gutter, the drain having a second open end opposite the first open end;

a container mounted at a monitoring point of the gutter and extending at least partially into the gutter, the container having a closed end situated in the gutter and a capped end opposite the closed end, the container having an enclosing wall extending from the closed end to the capped end to define an interior region, a plurality of holes being formed in the enclosing wall, the holes being positioned a predetermined distance from the closed end of the container, the container being positioned with respect to a valley of the gutter such that the holes permit flow of the gutter water into the interior region of the container from the gutter when the water level reaches a predetermined level;

a flotation piece situated in the interior region of the container, the flotation piece capable of floating on water contained in the interior region such that the flotation piece rises responsive to rising of a level of the water contained in the interior region; and a visual indicator piece coupled to the flotation piece by a shaft extending through a hole formed in the capped end of the container, the shaft having a first end attached to the visual indicator piece and a second end opposite the first end, the second end of the shaft attached to the flotation piece such that the visual indicator piece rises with the flotation piece responsive to rising of the level of the water contained in the interior region of the container, the visual indicator piece configured to provide notification of the overflow condition when the water in the gutter has reached the overflow condition.

23. The overflow monitoring gutter and drainage system of claim 22, the monitoring point of the gutter being remotely located from the drainage point of the gutter.

24. The overflow monitoring gutter and drainage system of claim 22, the monitoring point of the gutter being located a predetermined distance from the drainage point of the gutter.

25. An overflow monitoring gutter and drainage system for determining whether water has reached an overflow condition, the overflow monitoring gutter and drainage system comprising:

a gutter assembly including a plurality of gutters attached along a roof of a building;

a plurality of drains attached respectively along sides of walls of the building, each drain having a first open end in fluid communication with an opening formed in a valley of a respective one of the gutters at a drainage point of the one gutter, the drain having a second open end opposite the first open end; and a plurality of gutter overflow detection devices situated at predetermined locations of the gutters about the building roof, each gutter overflow detection device capable of determining whether water in the respective gutter has reached an overflow condition responsive to a level of the gutter water, each gutter overflow detection device including:

a container mounted such that the container extends at least partially into the gutter, the container having a closed end situated in the gutter and a capped end opposite the closed end, the container having an enclosing wall extending from the closed end to the capped end to define an interior region, a plurality of holes being formed in the enclosing wall, the holes being positioned a predetermined distance from the closed end of the container, the container being positioned with respect to a valley of the gutter such that the holes permit flow of the gutter water into the interior region of the container from the gutter when the water level reaches a predetermined level, a flotation piece situated in the interior region of the container, the flotation piece capable of floating on water contained in the interior region such that the flotation piece rises responsive to rising of a level of the water contained in the interior region, and a visual indicator piece coupled to the flotation piece by a shaft extending through a hole formed in the capped end of the container, the shaft having a first end attached to the visual indicator piece and a second end opposite the first end, the second end of the shaft attached to the flotation piece such that the visual indicator piece rises with the flotation piece responsive to rising of the level of the water contained in the interior region of the container, the visual indicator piece configured to provide notification of the overflow condition when the water in the gutter has reached the overflow condition.

26. The overflow monitoring gutter and drainage system of claim 25, each gutter overflow detection device further including:

a float sensor situated to monitor the water level and gather water level data, an antenna coupled to the float sensor, the antenna capable of transmitting the water level data to a central data processing location.

27. A gutter overflow detection device for providing notification of an overflow condition when water in the gutter has reached an overflow condition, the device comprising:

a container mounted in the gutter to extend at least partially into the gutter, the container comprising a closed bottom, an enclosing wall extending from the closed bottom and defining an open top to form an interior region, and a hole formed in the container to permit the flow of water into the interior region of the container from the gutter;

a water level detection and notification apparatus situated in the interior region of the container and configured to float on water in the container to detect rising of a level of the water in the interior region and to provide notification of an overflow condition when the water level reaches an overflow condition level in the container.

28. The device of claim 27 wherein the detection and notification apparatus comprises a visual indicator configured to deploy when the overflow condition is detected.

29. The device of claim 28 wherein the visual indicator comprises a spring-loaded flag that remains deployed until reset by a user.

30. The device of claim 28 wherein the visual indicator is coupled to a flotation piece by a shaft extending through a hole formed in a cap positioned on the open top of the container, the shaft having a first end attached to the visual indicator and a second end attached to the flotation piece, the shaft having serrated edges that interact with the cap to maintain the visual indicator in a deployed condition after the overflow condition is detected and to remain in the deployed condition until reset by a user.

31. The device of claim 27 wherein the detection and notification apparatus comprises an electronic signal generator configured to generate a signal that is transmitted to a user when the overflow condition is detected and to continue transmitting the signal until reset by a user.

* * * * *

UNITED STATES PATENT AND TRADEMARK OFFICE
CERTIFICATE OF CORRECTION

PATENT NO. : 6,786,091 B1
DATED : September 7, 2004
INVENTOR(S) : Amin S. M. Aleali It is certified that error appears in the above-identified patent and that said Letters Patent is hereby corrected as shown below:

<u>Column 11,</u>
Line 4, "cutter" should read as -- gutter --.

Signed and Sealed this

Sixteenth Day of August, 2005

JON W. DUDAS
*Director of the United States Patent and Trademark Office*